Feb. 6, 1923.
E. C. MILLER
TRAP NEST
Filed Aug. 2, 1921
1,444,629
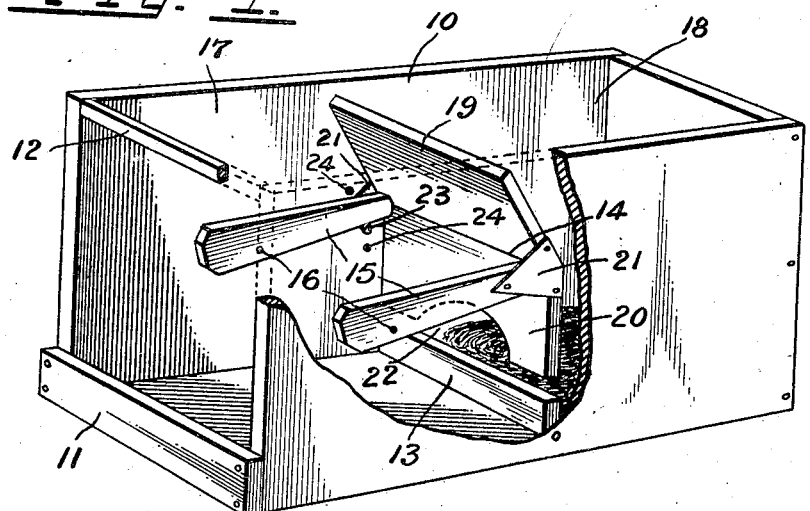
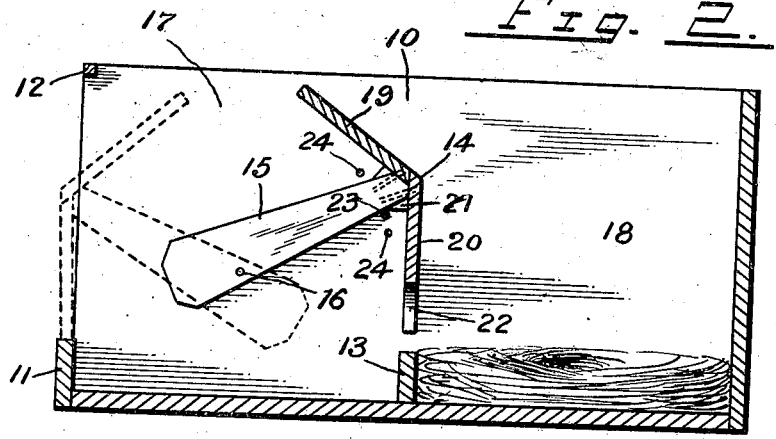
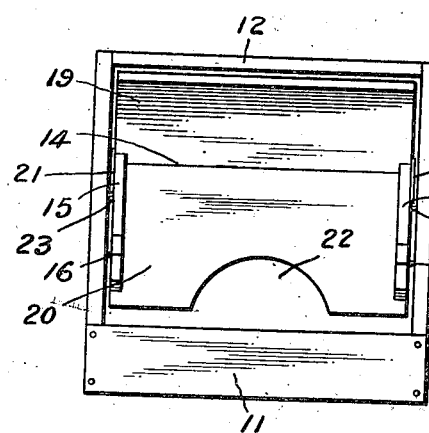
INVENTOR
Edwin C. Miller
BY John W. Maupin
ATTORNEY Patented Feb. 6, 1923.

1,444,629

UNITED STATES PATENT OFFICE.

EDWIN C. MILLER, OF WOODINVILLE, WASHINGTON.

TRAP NEST.

Application filed August 2, 1921. Serial No. 489,237.

*To all whom it may concern:*

Be it known that I, EDWIN C. MILLER, a citizen of the United States, residing at Woodinville, in the county of King and State of Washington, have invented a new and useful Trap Nest, of which the following is a specification.

This invention relates to improvements in trap nests, and the principal object of the invention is to provide a trap nest by means of which fowls will trap themselves upon entering same to deposit eggs and thus affording a means whereby a record may be kept of each fowl and each egg which is laid by said fowls.

Further objects of the invention are to provide a trap nest which is simple and economic in construction, positive and efficient in operation, and in which there are no triggers, wires or other obstacles on which the nest straw would catch and tend to prevent the proper function of said trap nest.

With the above and other objects in view which will appear as the description proceeds, the invention consists of the novel construction, adaptation, arrangement and combination of parts hereinafter described and claimed.

These objects are accomplished by devices illustrated in the accompanying drawings, wherein—

Figure 1 is a view in perspective of a trap nest embodying the features of the invention, with parts of the housing broken away;

Fig. 2 is a view in central longitudinal vertical section of same; and

Fig. 3 is a view in front elevation.

Referring to the drawings, throughout which like numerals designate like parts, the numeral 10 designates the housing which is rectangular in shape and is ordinarily open at its top and front ends and is preferably constructed of wood.

A transverse strip 11 is secured to the bottom of the front end of the housing 10 and a transverse spacer strip 12 is secured at the top corners of said front end between the sides thereof. A cleat 13 is secured to the floor and sides of said housing at a point substantially midway between the front and rear ends thereof.

A trap door 14, provided at its lateral ends with arms 15 which are pivotally secured, as at 16, to the sides of the housing 10, is arranged in conjunction with the cleat 13, to divide said housing into two functionally separate compartments 17 and 18 when disposed in its normal position as shown in full lines in Figs. 1 and 2 of the drawings.

The trap door 14 is made of two boards 19 and 20 fastened together and angularly disposed to one another and the inner ends of the arms 15 are fastened to the under sides of said boards where they join as shown in the drawings. Angular sheet metal plates 21 are secured to the outer sides of said boards and arms to strengthen same. A substantially semi-circular opening 22 is provided in the lower side of the board 20 and stops 23 arranged to fit in holes 24 are provided in the sides of the housing 10 for limiting the downward movement of said trap door as more fully hereinafter described.

The trap nests are ordinarily placed between rows of shelves or they are superimposed one upon the other with the upper shelf or the floor of the upper trap nest serving as a top for the under trap. By this arrangement no tops are required for the trap nests and consequently they may be readily removed and cleaned.

In the operation of my device, the fowl enters the compartment 17, and, upon seeing the nest in the compartment 18 through the opening 22, she will pass into said compartment through said opening and in doing so her back will raise the trap door 14 about the pivots 16 until the center of gravity of said trap door passes forward of said pivots when said trap door will fall to the position shown in dotted lines in Fig. 2 of the drawings with the board 19 resting on the strip 11 and the fowl will be trapped in the nest. In practice, said trap door usually strikes the fowl's tail feathers in the act of falling upon the strip 11 which serves to break its fall and also as an incentive to the fowl to enter the laying compartment 18.

After the fowl has deposited her egg the attendant raises the trap door 14 to a substantially vertical position, removes the fowl, and registers the identification mark shown on her leg band. In this way an exact record of each bowl may be kept and the poor layers may be eliminated.

The trap door 14 and arms 15 are so designed and the pivots 16 are so disposed as to maintain the correct balance of said trap door consistent with the size of the fowls using the trap nest, and it will be obvious that this feature may also be regulated by shifting the stops 23 to different holes 24.

From the foregoing description taken in connection with the accompanying drawings the form of construction and method of operation of my trap nest will be readily apparent to those skilled in the art to which the invention relates, and, while I have described the principle of operation of the invention together with the device which I now consider to be the best embodiment thereof, it will be understood that the apparatus shown is merely illustrative and that such changes may be resorted to as are within the scope and spirit of the invention.

What I claim is:

1. A trap nest comprising a housing open at one end to constitute the entrance, a trap door within the housing having first and second boards disposed at an angle to each other, arms pivoted to the housing and at one end crossing the junction line of the boards and being in contact with each board whereby the door is rigidified, the first board in one position adapted to be substantially vertically disposed with the second board extending upwardly therefrom and toward the entrance, said first board adapted to be shifted by contact with the body of a fowl passing beneath the same to dispose the center of gravity of the door on the other side of the fulcrum of the door whereby the second board will be substantially vertically disposed and the first board will extend inwardly and upwardly away from the entrance.

2. A trap nest comprising a housing open at one end to constitute the entrance, a trap door within the housing having first and second boards disposed at an angle to each other, arms pivoted to the housing and at one end crossing the junction line of the boards and being in contact with each board whereby the door is rigidified, the first board in one position adapted to be substantially vertically disposed with the second board extending upwardly therefrom and toward the entrance, said first board adapted to be shifted by contact with the body of a fowl passing beneath the same to dispose the center of gravity of the door on the other side of the fulcrum of the door whereby the second board will be substantially vertically disposed and the first board will extend inwardly and upwardly away from the entrance, strengthening plates secured to the arm and ends of each board, said plates being relatively wide at the board and bridging the junction line thereof, the lower edge of the first board being cut away to facilitate entrance of the fowl, a cleat rising from the base of the housing in alinement with the first board in its first position, the housing being open at its top, and a strip at the entrance to the housing constituting a rest for the second wall in its second mentioned position.

EDWIN C. MILLER.